July 8, 1952 E. F. MARTINET ET AL 2,602,685
SUCTION CLEANER CLAMP

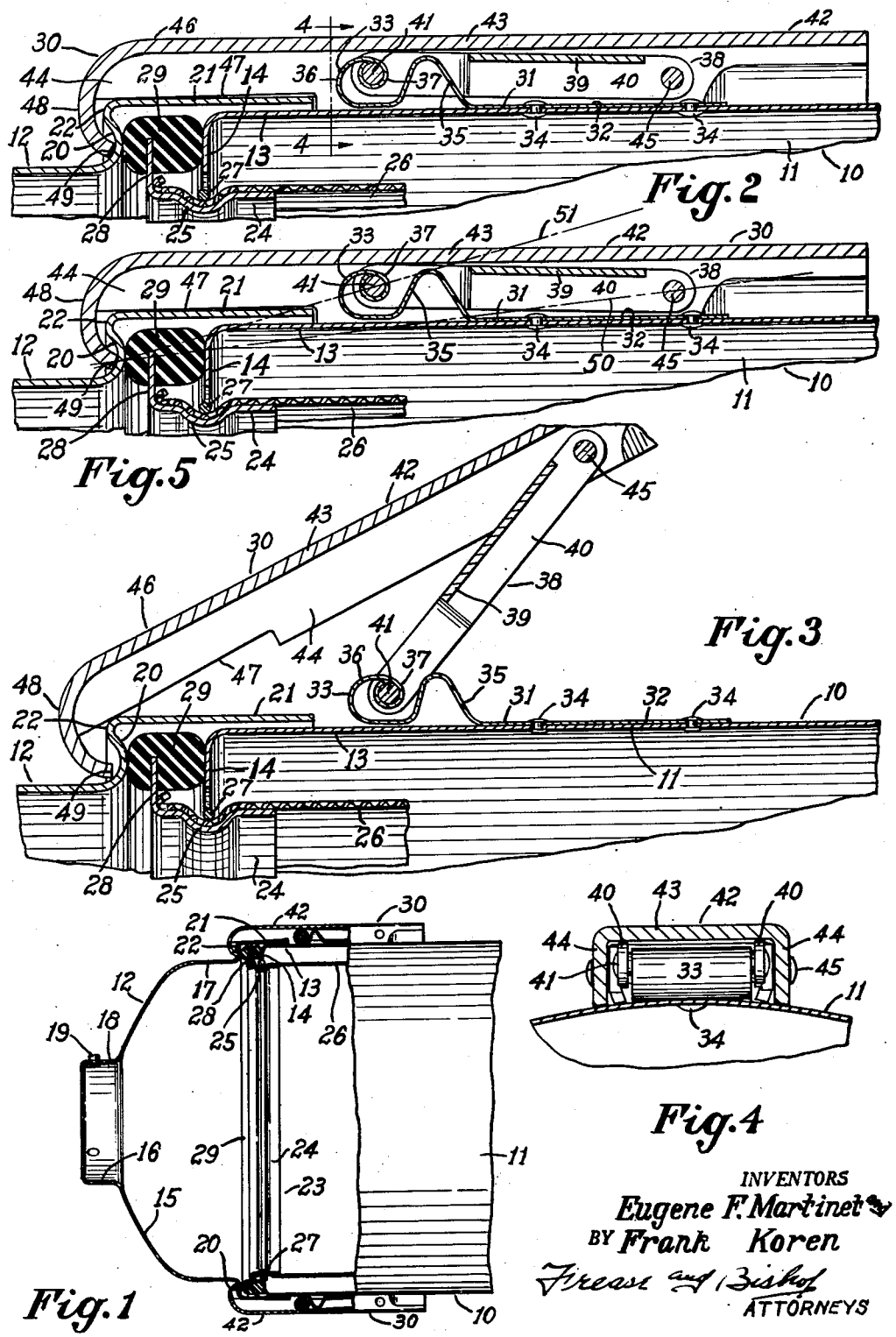

Filed April 7, 1949 2 SHEETS—SHEET 2

INVENTORS
Eugene F. Martinet
BY Frank Koren
ATTORNEYS

UNITED STATES PATENT OFFICE 2,602,685

SUCTION CLEANER CLAMP

Eugene F. Martinet and Frank Koren, Cleveland, Ohio, assignors to Royal Vacuum Cleaner Company, Cleveland, Ohio, a corporation of Ohio Application April 7, 1949, Serial No. 85,975

3 Claims. (Cl. 292—114)

The invention or discovery relates to swinging link bar clamps in general, and more particularly to swinging link bar clamps adapted for use in suction cleaners of the tank type where such clamps are used to secure or clamp a closure, cap or bell to an open end of the tank casing, a yielding or compressible gasket being provided at the joint between the closure and casing, and said gasket usually forming a seal for the dust filter.

In prior swinging link bar clamps used on tank type suction cleaners, the link bar pivots ordinarily have been fixed, and a joint sealed against air leakage is obtained by compression of the gasket at the joint by the clamp. Such gaskets ordinarily are formed of molded rubber, and it is difficult to maintain close tolerances in the production manufacture of molded rubber gaskets. As a result, sometimes certain portions of the gaskets, due to variance in dimensions, are not compressed to any great extent, if at all, and air leakage may occur at the joint.

An even more serious difficulty occurs due to the high vacuum under which tank type cleaners operate. When the cleaner is operating, a high vacuum is present within the tank and cap or closure member, or in other words, low pressure exists within the tank relative to atmospheric pressure exterior of the tank. This pressure differential causes the closure cap to move or seat under pressure toward the tank, compressing the gasket at the joint therebetween to a considerably greater extent than the gasket normally is compressed by the clamps when the cleaner is not operating.

A fixed pivot link bar clamp, depending on gasket compression for clamping action, is in a fixed or stationary position with respect to the closure bell and tank casing when clamped and when the cleaner is not operating. Thus, as the closure member and tank move toward each other compressing the gasket incident to the pressure differential when the cleaner is operating, the fixed position clamp is released from engagement with at least one of the members clamped thereby. The loosening of the clamp thus effected frequently is enough that the clamp will unhook by itself during cleaner operation. Thereafter, when the cleaner is shut off, the clamps no longer secure the closure cap to the tank. Even though the clamp loosening is insufficient to result in unhooking of the clamp, the looseness of the clamp results in rattling thereof during cleaner operation which is particularly annoying.

Accordingly, it is a primary object of the present invention or discovery to provide an improved swinging link bar clamp for a tank type suction cleaner in which the construction and arrangement of the clamp and its association with the suction cleaner parts clamped thereby are such that the clamp will not become loosened during operation of the suction cleaner under high vacuum regardless of whether relative movement between the clamped parts occurs during such cleaner operation.

It is a further object of the present invention to provide a swinging link bar clamp for use in a tank type suction cleaner in which the clamp parts are arranged to impose a yielding clamping action at all times at the joint between the cleaner parts clamped thereby.

Moreover, it is an object of the present invention to provide tank type suction cleaner swinging link bar clamp parts so constructed and arranged as to resist being bent out of shape or out of alignment in use and to resist failure in use.

Also, it is an object of the present invention to provide a tank type suction cleaner clamp which maintains the suction cleaner closure cap or end bell pressed under tension against the gasket at the joint between the end bell and cleaner tank under all suction conditions.

In addition, it is an object of the present invention to provide a tank type suction cleaner swinging link bar clamp constructed and arranged in clamped position to lie substantially flat against and to closely hug the cleaner walls with minimum projection laterally therefrom.

Finally, it is an object of the present invention to provide a tank type suction cleaner swinging link bar clamp construction having a simplified arrangement of parts, permitting economical manufacture, and convenience in use.

The foregoing and other objects are attained by the swinging link bar clamps, parts, combinations, and sub-combinations, which comprise the present invention or discovery, and the nature of which is set forth in the following general statement, and preferred embodiments of which are set forth in the following description, and which are particularly and distinctly pointed out and set forth in the appended claims forming part hereof.

The nature of the improved swinging link bar clamp of the present invention or discovery may be stated in general terms as including first and second longitudinally extending members having opposite interengaging end portions, a resilient member preferably interposed between and in abutment with the opposite ends of the longitudinally extending members, the first longitudinally extending member having a recessed clamp hook catch on its interengaging end, a laterally rigid longitudinally extendable tension spring link bar having one end secured to the second longitudinally extending member and a free end extending toward the first longitudinally extending member, the free end of the spring link bar being movable longitudinally and transversely with respect to the second longitudinally extending member, a swinging link bar, one end of the swinging link bar having a lateral pivot connection with the free end of the tension spring link bar, a hook link bar, a laterally extending pivot connection between the other end of the swinging link bar and the hook link bar, and the hook link bar having a hook end adapted to engage the hook catch recess of the first longitudinally extending member, and the hook link bar and the swinging link bar being arranged to swing to and from clamping longitudinally extending positions alongside the first and second longitudinally extending members.

By way of example, embodiments of the improved swinging link bar clamp of the present invention or discovery are illustrated in the accompanying drawings forming part hereof, in which:

Figure 1 is a fragmentary view with portions broken away and shown in section showing the suction inlet end of a tank type suction cleaner including embodiments of the improved swinging link bar clamps in combination with other parts;

Fig. 2 is an enlarged fragmentary longitudinal sectional view of one of the improved clamps of Fig. 1, and associated parts, the parts being shown in clamped position;

Fig. 3 is a view similar to Fig. 2 showing the parts in unclamped or released position;

Fig. 4 is a fragmentary transverse sectional view as on line 4—4, Fig. 2;

Fig. 5 is a view similar to Fig. 2, showing diagrammatically certain principles of construction and operation of the improved clamp;

Similar numerals refer to similar parts throughout the drawings.

Figure 6:
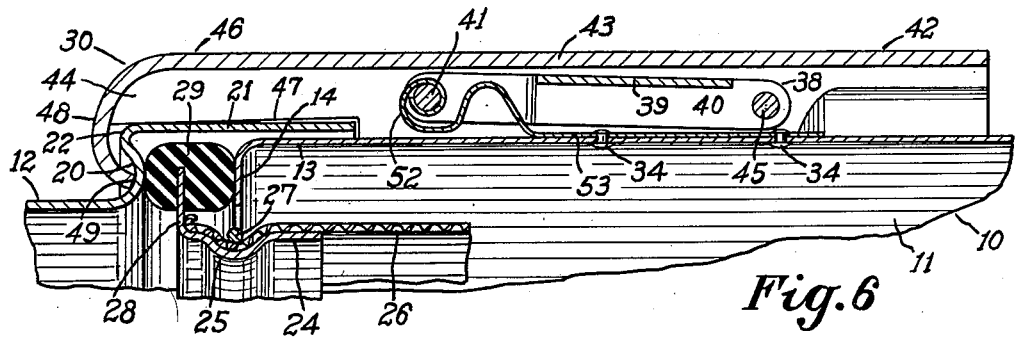
Fig. 6 is a view similar to Fig. 2 showing a modified form of improved clamp construction.

A usual horizontal tank type suction cleaner is indicated generally at 10, and includes in combination with other usual tank type suction cleaner parts, a tank casing indicated generally at 11, and a front or suction inlet end closure, cap, bell or head indicated generally at 12. The casing 11 preferably is provided at its front or suction end 13 with an inwardly extending annular abutment flange 14. The bell 12 includes a central dome 15, a front annular inlet collar 16, and a rear annular wall 17. The bell collar 16 has an outer face 18 from which extend radially outwardly one or more bayonet joint lock pins 19, which are used in the usual manner for connection of the bell inlet collar 16 with the annular connector end of a hose coupling, extension tube, or similar suction cleaner accessory, not shown.

The bell wall 17 is provided with an outwardly extending annular flange indicated generally at 20 from the outer periphery of which an annular end sleeve 21 extends. The sleeve 21 has an inner surface telescoped over the outer surface of the front end 13 of the tank casing 11 when the parts are assembled.

A recessed clamp hook catch is provided in the front face of the bell flange 20 by forming an outwardly opening annular catch groove 22 in the flange 20 by reversely bending the same to overhang the wall 17.

In the assembled suction cleaner 10 the bell flange 20 is spaced forwardly from the casing flange 14, and in the central opening of the flange 14 there is located the cleaner filter or dust collector bag inlet ring indicated generally at 23 which preferably includes a cylindrical band 24 having formed therein an outwardly opening annular groove 25. The cleaner bag 26 located in the casing 11 has a front end fitting on the outer face of the bag inlet ring band 24 and retained in the groove 25 thereof by a split spring ring 27.

The bag inlet ring 23 furthermore includes an outwardly extending gasket retaining flange 28, and an annular bag inlet gasket 29 made of rubber or other suitable resilient material. The gasket 29 has an inwardly opening groove which fits on and is retained by the outer peripheral portion of the bag inlet ring retaining flange 28. The gasket 29 is located between and abuts the opposite faces of the casing flange 14 and the bell flange 20.

The suction cleaner 10 furthermore includes two or more and preferably a pair of opposite improved swinging link bar clamps each indicated generally at 30. The clamps 30 yieldingly clamp the opposite interengaging telescoping end portions of the casing 11 and the bell 12 with the gasket 29 interposed between flanges 14 and 20, as above described, to form a joint sealed against air leakage between members 11 and 12. The casing 11 and bell 12 may otherwise be described as first and second longitudinally extending members having opposite interengaging end portions, and each clamp 30 includes in its parts the first and second longitudinally extending members.

Each clamp 30 furthermore includes a laterally rigid longitudinally extendable tension spring link bar 31 having a rear end 32 secured to and upon the outside of the tank casing 11 by rivets 34. The front end 33 of spring bar 31 extends toward the front end 13 of the tank casing 11 and toward the bell 12. The spring link bar 31 is made from a flat strip of spring steel which after forming is hardened and tempered. For attaining the desired lateral rigidity in the spring link bar 31, its width is many times its thickness.

As shown, the free end 33 of the spring link bar 31 preferably is formed with a deep V bend 35 immediately following the rear end 32 and the V bend 35 opens toward the casing 11. The free end 33 of the spring link bar 31 is further formed at its front extremity with a rearwardly opening somewhat spiral bend 36 terminating in a pivot pin bearing loop 37 which is cylindric and has a laterally extending cylindric axis. The loop 37 and the apex of the V bend 35 are located outward of the remaining portion of the spring link bar 31. When the clamp 30 is in the released position, as shown in Fig. 3, the reverse bend 36 and its junction with the V bend 35 are spring biased to be slightly spaced from the outside of the casing 11. The V bend 35 and the reverse bend 36 may be otherwise termed lateral corrugations in the spring link bar 31.

Each clamp 30 furthermore includes a swinging link bar 38 which as shown is formed from a channel section having a base 39 and legs 40, the channel base 39 being cut away at opposite ends. At one end the channel legs 40 are connected with the free end 33 of the spring link bar 31 by a laterally extending pivot pin 41 which rotatably fits in the loop 37 and has its ends secured in the channel legs 40.

Each clamp 30 also includes a hook link bar 42 which as shown is formed from a channel section including a web 43 and legs 44. The outer ends of the swinging link bar channel legs 40 fit and extend between the hook link bar channel legs 44 intermediate the ends thereof, and a laterally extending pivot pin 45 rotatably fits in apertures formed in the swinging link bar channel legs 40, and the ends of the pivot pin 45 are secured in the hook link bar channel legs 44. At the front end 46 of the hook link bar 42, the channel legs 44 are formed with longitudinally extending notches 47 for receiving the bell and sleeve 21 when in the clamped position as shown in Fig. 2. The forward ends of the hook link bar channel legs 44 are cut short of the forward end of the web 43 which is formed as a rearwardly opening hook 48 having a hook extremity 49.

When a tank type suction cleaner is being used, the dust collector bag 26 becomes filled with dust and is required to be emptied from time to time. In order to empty the bag 26, the end bell 12 is removed by unlatching the clamps 30 whereupon the bag 26 may be lifted from the tank. After emptying, the bag 26 is replaced in tank 11 and the end bell 12 is telescoped over the front end 13 of the tank 11. The clamps 30 are then operated to securely clamp the end bell 12 to the tank 11.

This clamping operation is shown in Figs. 2, 3 and 5 wherein one of the clamps is illustrated in Fig. 3 with its parts in released position just ready for clamping. In this released position, the hook 49 of link bar 42 extends into recessed groove 22 on the bell member 12 and the link bar 42 extends outwardly at an angle from the tank 11, the swinging bar 38 also lying in an angled position with respect to the link bar 42 and the tank 11.

The rear or free end of the bar 42 is then pressed toward tank 11 from the position shown in Fig. 3 until it reaches the position shown in Fig. 2. As the link bar 42 is initially pressed downward, the reverse bend 36 at the free end 33 of the spring link bar 31 moves downward until it contacts the tank wall 11. The free end 33 of bar 31 and pivot pin loop 37 thereof then move somewhat longitudinally of the tank toward the front or open end thereof. Such movement is permitted because the bar 31 considered as a whole can stretch or elongate longitudinally by a widening of the V in the deep V bend 35.

This so-called stretching or elongation of the end portion 33 of spring bar 31 continues until a straight line passing through the contact point of the hook 49 with the bell recess groove 22 and the center of pivot pin 45 (designated by dot-dash line 50 in Fig. 5) coincides with a straight line passing through the contact of hook 49 with recess 22 and the center of pivot pin 41 (designated by dot-dash line 51 in Fig. 5).

As downward pressing of the bar 42 continues, line 50 moves below line 51 to the final position shown in Fig. 5 and pivot pin 45 moves below line 51, pivot pin 41 being above line 50. In other words, pivot pin 41 in effect has passed over center and because the free end 33 of spring link bar 31 is normally spring biased away from casing 11 as illustrated in Fig. 3, pivot pin 41 and reverse bend 36 of spring link bar 31 move upward away from the casing to the final position shown in Fig. 5 wherein the reverse bend 36 is spaced above and clear of the casing 11.

It is desirable, in the final clamped position, that the pivot point 41 be as high or as far as possible above or away from casing 11 in order to obtain the greatest distance possible between the pivot pin 41 and the line 50 so that the spring link bar 31 exerts maximum effort constantly urging the hook link bar 42 toward clamping position, and holding the same in such position.

The fact that the free end 33 of spring link bar 31 is normally spring biased away from casing 11 helps to achieve this result by actually raising the pivot point during the final course of movement of the clamping bar 42 to locking position.

In other words, the higher that the pivot point 41 is above line 50 the more secure is the locking action and the more the clamp structure tends to urge the clamp toward and hold it in locking position.

The yielding clamping pressure thus exerted by the hook link bar 42 on the bell flange 20 and the resilient gasket 29 is effective to maintain the bell 12 sealed against the gasket 29 and the tank flange 14 in air-tight relation at all times during operation of the cleaner 10 and under all suction conditions.

Although the spring link bar 31 may elongate as described and the center line of pivot 41 may move lengthwise or crosswise of the cleaner tank, nevertheless, the lateral rigidity of the spring bar 31, the link bar 38 and the hook bar 42 provides a construction in which all of the clamped parts are highly resistant to being bent out of shape or to being twisted out of alignment in use and provides a construction in which failure or breakage of any of the clamped parts is unlikely to occur.

Fig. 6 shows a slightly modified form of improved clamp construction which is identical to that shown in Fig. 5 excepting for a different shape for the free end of the spring link bar 31. In the construction shown in Fig. 6, the reverse bend 52 at the end of spring link bar 53 is shorter than the reverse bend 36 at the end of spring bar 31 and is more nearly spiral in shape. This modified construction does not depend on spring biasing the looped end of the spring bar away from the tank 11 to obtain movement of the pivot point 41 away from the tank 11 when the clamp is locked under tension. The act of putting tension on spring 53 tends to unwind loop 52 in such a way as to move the pivot point 41 farther away from the tank 11, thereby increasing the distance between the pivot point 41 and the casing 11 and thus obtaining the same resultant action that is obtained by the construction and arrangement of spring 31 in Figs. 1 to 5.

Accordingly, in both constructions shown in Figs. 1 through 6, the pivot pin 41 in clamped position is pushing away from the tank 11. In the construction shown in Figs. 1 to 5, this pushing of the pin 41 away from the tank 11 occurs from the mechanical leverage existing at the full locked position and from the normal spring bias of the reverse bend 36 as illustrated in Fig. 3. In the construction shown in Fig. 6, the pushing away of the pivot pin 41 from the tank 11 when the clamp is in locked position results from the mechanical leverage existing at the full locked position of the parts and the unwinding action of looped end 52 described.

Figure 7:
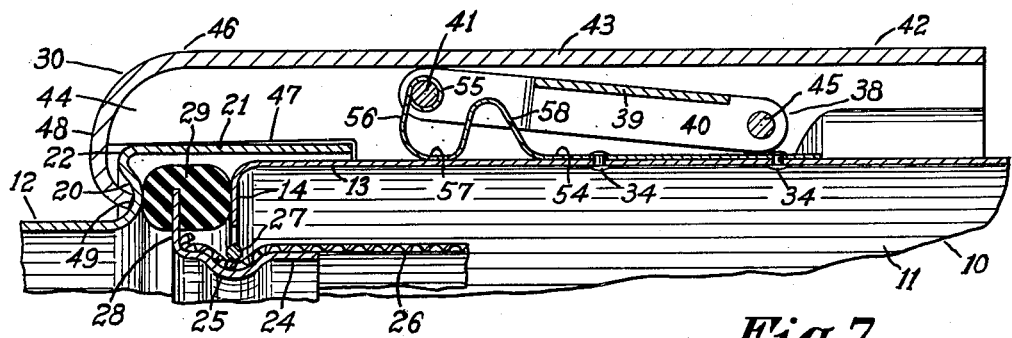
Fig. 7 is a view similar to Figs. 2 and 6 showing a further modified form of improved clamp construction.

A further modified form of construction is shown in Figs. 7 and 8 which again is identical to the constructions shown in Figs. 1 through 6 excepting for the construction and arrangement of the free end of the spring link bar. In the construction illustrated in Figs. 7 and 8, the spring link bar 54 is formed at its free end with a loop 55 for mounting the pivot pin 41 at the end of a straight arm portion 56 which slants backward toward the rear end of the tank 11, the slanting portion 56 being connected by portion 57 with the deep V bend 58.

The free end 56—57 of the spring link bar 54 is not spring biased away from the tank 11 but a part of portion 57 lies against the wall of tank 11 at all times.

Figure 8:
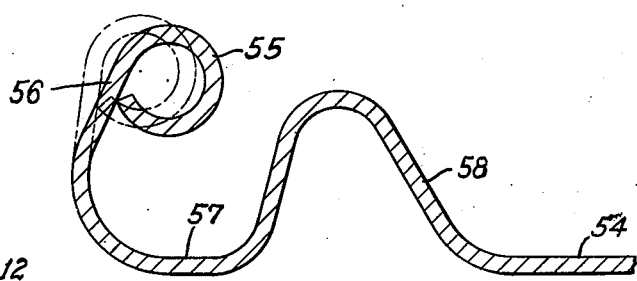
Fig. 8 is an enlarged somewhat diagrammatic view illustrating an end portion of the spring link used in the construction of Fig. 7.

When the spring 54 is placed under tension during the clamping action, the free end thereof is pulled forward toward the end bell 12 and at the same time, the loop 55 for the pivot pin 41 swings in an arc as illustrated in Fig. 8, where the position when maximum clamping pressure is applied is illustrated in dot-dash lines. Thus, the same desired action occurring in the constructions of Figs. 2 and 6 occurs in the construction illustrated in Figs. 7 and 8, namely, the pivot point 41 rises with respect to the wall of tank 11 under increased tension, it being clear from Fig. 8 that the center of loop 55 is raised in the tensioned position illustrated in dot-dash lines above the free position illustrated in full lines.

Figure 9:
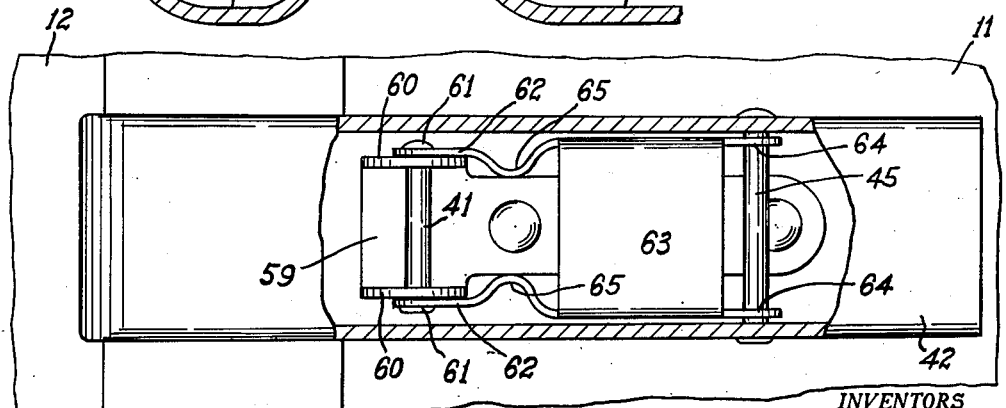
Fig. 9 is a fragmentary plan view with parts broken away and in section of a still further modified form of improved clamp construction.

Fig. 9 illustrates a further modified form of construction in which a rigid bracket 59 is mounted on tank 11 having ears 60 in which pin 41 is pivoted, the ends of pin 41 being connected at 61 with legs 62 of spring link 63. The rear ends of legs 62 are pivoted at 64 to pivot pin 45 mounted on hook link bar 42.

The member 63 is formed of spring stock and the legs 62 have arches 65 formed therein similar to the V bend 35 in spring link bar 31. In this construction, because the bracket 59 is rigid, the pivot point 41 cannot rise from the tank 11 when the clamp is in locked position, but the push of spring legs 62 when the clamp is locked exerts a force tending to raise the pivot point 41 so that the same ultimate effect is obtained and continuous tension between the bell member 12 and tank 11 is obtained under all stages of suction when the cleaner is in operation.

Accordingly, the present invention provides a clamp construction for tank type suction cleaners eliminating prior art difficulties, solving problems which have existed in the art, and obtaining the described new results not obtained by prior structures. Thus, the improved clamp structure is one in which the clamp will not become loosened during operation of the cleaner; in which the clamp parts are constructed and arranged to impose a yielding clamping action at all times at the joint between the cleaner parts clamped thereby; in which the clamped parts are constructed to resist being bent out of shape or alignment in use and to resist breakage or failure; in which a spring member is incorporated as one of the elements of a swinging link bar clamp which is maintained in tension at all times and under all suction conditions when the clamp is in clamping position; in which the clamp when in clamping position lies flat against or closely hugs the cleaner walls; in which the clamp parts when clamped tend to lock the parts more firmly in position; and in which the clamp parts are simple in design and economical to manufacture.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed.

Moreover, the embodiments of the improved construction illustrated and described are by way of example and the scope of the present invention is not limited to the exact details of construction of the various parts.

Having now described the features of the invention, the construction and operation of preferred embodiments of the improved clamp, and the advantageous, new and useful results obtained thereby; the new and useful devices, constructions, arrangements, combinations, subcombinations, parts and elements and reasonable mechanical equivalents thereof, obvious to those skilled in the art, are set forth in the appended claims.

We claim:

1. In clamp construction for a closure member of a tank type suction cleaner, a laterally rigid spring link bar having one end rigidly fixed to the cleaner tank, there being a laterally extending V-shaped corrugation formed in the spring bar adjacent its other end, said other end of the spring bar being reversely bent beyond said corrugation and terminating in a bearing loop, said V-shaped corrugation and said reverse bend providing tensioned movement of said bearing loop longitudinally and outward of the cleaner tank, a swinging link bar, a laterally extending pivot connection between one end of the swinging link bar and the bearing loop, a hook link bar, a laterally extending pivot connection between the other end of the swinging link bar and the hook link bar, and the hook link bar having a hook end adapted to engage the cleaner closure members.

2. In clamp construction for clamping together two members of a tank type suction cleaner, a laterally rigid spring strip metal link bar having one end rigidly fixed to one member to be clamped, there being a laterally extending V-shaped corrugation formed in the spring bar adjacent its other end, said other end of the spring bar being reversely bent beyond said corrugation and terminating in a laterally extending bearing loop, said V-shaped corrugation and said reverse bend providing tensioned movement of said bearing loop in directions generally longitudinal with respect to and normal with respect to the spring bar, a channel-shaped swinging link bar, a laterally extending pivot connection between one end of the swinging link bar and the bearing loop, a channel-shaped hook link bar, a laterally extending pivot connection between the other end of the swinging link bar and the hook link bar, the hook link bar having a hook end adapted to engage the other member to be clamped, and the channel-shaped swinging link bar nesting over and enclosing the spring bar and the channel-shaped hook link nesting over and enclosing the swinging link bar when the parts are in clamped position.

3. In clamp construction for a closure member of a tank type suction cleaner, a laterally rigid spring link bar rectangular in cross section having one end rigidly fixed to the cleaner tank, there being a laterally extending inwardly opening V-shaped corrugation formed in the spring bar adjacent its other end, said other end of the spring bar being formed with an outward projecting reverse bend beyond said corrugation and terminating in a bearing loop, said V-shaped corrugation and said reverse bend providing tensioned movement of said bearing loop longitudinally and outwardly, a swinging link bar, the link bar being pivoted at one end to said loop, a clamp bar, the clamp bar being pivotally connected to the other end of said link bar, the clamp bar having a hook end adapted to engage the cleaner closure member, said loop being located outward of the cleaner and of a straight line passing through the point of engagement of the hook end with the closure member and the pivotal connection between the clamp and link bars when the parts are in clamping position, and said loop moving outwardly of the cleaner as the parts are moved to clamping position.

EUGENE F. MARTINET.
FRANK KOREN.

REFERENCES CITED

The following references are of record in the file of this patent:

UNITED STATES PATENTS

| Number | Name | Date |
| --- | --- | --- |
| 2,328,003 | Gardes | Aug. 31, 1943 |
| 2,462,282 | Pickford | Feb. 22, 1949 |